United States Patent [19]

Maeda et al.

[11] Patent Number: 4,546,303
[45] Date of Patent: Oct. 8, 1985

[54] STATIC REACTIVE-POWER COMPENSATION APPARATUS

[75] Inventors: Takafumi Maeda; Setsurou Mine, both of Tokyo, Japan

[73] Assignees: Tokyo Electric Power Co., Inc.; Mitsubishi Denki Kabushiki Kaisha, both of Tokyo, Japan

[21] Appl. No.: 594,662

[22] Filed: Mar. 29, 1984

[30] Foreign Application Priority Data

Mar. 29, 1983 [JP] Japan .................................. 58-53114

[51] Int. Cl.$^4$ ................................................ G05F 1/70
[52] U.S. Cl. .................................................... 323/210
[58] Field of Search ................ 323/208, 209, 210, 211

[56] References Cited

U.S. PATENT DOCUMENTS 4,275,346  6/1981  Kelley, Jr. .......................... 323/210
4,353,024 10/1982  Gyugyi ................................ 323/210
4,472,674  9/1984  Yano et al. .......................... 323/210

OTHER PUBLICATIONS

Electronics, vol. 22, No. 5, May 1949, pp. 116, 118, 120, 25; E. W. Tschudi, "Transfer Function for R-C and R-L Equalizer Networks", p. 120, Item 25.

Primary Examiner—Peter S. Wong
Assistant Examiner—Judson H. Jones
Attorney, Agent, or Firm—Sughrue, Mion, Zinn, Macpeak and Seas

[57] ABSTRACT

A static reactive-power compensating apparatus in which transients having a frequency below a predetermined frequency are not compensated for while all other variations are fully compensated for. A reset filter circuit is connected between the output of a rectifier circuit and a thyristor control circuit, the latter controlling the firing of thyristors which couple a reactive energy storage bank to the power system for compensating for voltage variations in the system. Preferably, the reset filter has a transfer characteristic of $sT_1/(1+sT_1)$.

3 Claims, 7 Drawing Figures

STATIC REACTIVE-POWER COMPENSATION APPARATUS

BACKGROUND OF THE INVENTION

The present invention relates to a static reactive-power compensating apparatus for improving the stability of a power system by performing reactive-power control quickly in the event of a sudden change in voltage of the power system.

Conventionally, an arrangement as shown in FIG. 1 has been proposed as a reactive power compensating apparatus (hereinafter referred to as an SVC) for power system stabilization. In the drawing, reference numeral 1 designates a control quantity detecting circuit constituted by a rectifier circuit 1a, used for detecting a bus-bar voltage, and a reference voltage setting circuit 1b. Reference numeral 2 designates a thyristor control circuit, 3 a reactor, 4 a capacitor, and 5 thyristors.

FIG. 2 is a diagram showing the FIG. 1 circuit arrangement in block diagram form. When the voltage of the bus-bar to which the apparatus is coupled changes as shown in FIG. 3, reactive power, in an amount determined depending on the time constant $T_y$ of the rectifier circuit 1a, the susceptance $B_L$ of the reactor 3, the susceptance $B_C$ of the capacitor 4, the control system gain K, and the dead time delay $T_D$, is supplied to suppress the voltage change. Even a considerably quick voltage change can be responded to without delay in this arrangement since phase control of the thyristors is employed.

However, due to the use of a fixed value $V_C$ as a reference as shown in FIG. 2, the conventional SVC responds also to a voltage changes of a long period which can be remedied even by low-speed reactive-power control, that is, manual operation. Further, when a voltage change which has a short period is superposed on a voltage change having a considerably larger amplitude, the output of the SVC will reach its rated value during the suppression of the low-frequency voltage change, and hence a dead time may occur in which high-speed control to suppress the second transient cannot be carried out (hatched portions in FIG. 4).

It is a primary object of the present invention to eliminate the above-mentioned defects in the conventional apparatus.

SUMMARY OF THE INVENTION

Achieving the above and other objects, the invention provides a static reactive-power compensation apparatus in which a reset filter is inserted in a control quantity detecting circuit so that reactive-power can be rapidly controlled when a system voltage changes suddenly, thereby improving the stability of the power system in which the apparatus is employed.

DESCRIPTION OF THE PREFERREND EMBODIMENTS

Figure 5:
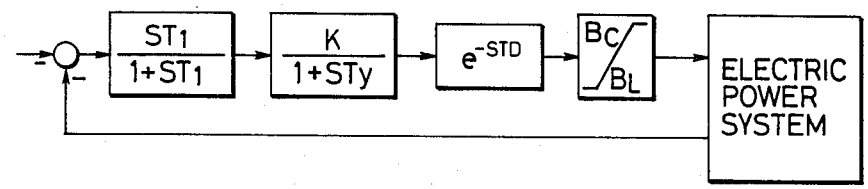
FIG. 5 is a block diagram used for illustrating the operating characteristics of an apparatus constructed according to a preferred embodiment of the present invention.
Figure 6:
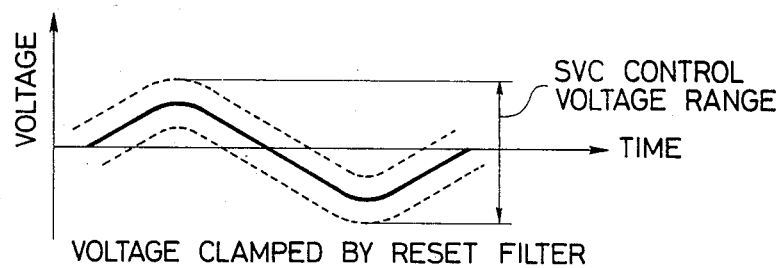
FIG. 6 is a waveform diagram showing the range of control voltage employed in the apparatus of the preferred embodiment.

Referring to the drawings, a preferred embodiment of the present invention will be described. FIG. 5 is a block diagram showing the configuration of a compensating apparatus of the present invention, and FIG. 7 is a circuit diagram of the apparatus of FIG. 5.

Figure 1:
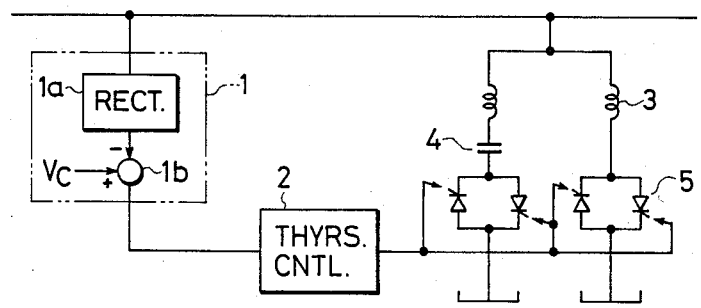
FIG. 1 is a circuit diagram showing an example of a conventional static reactive-power compensating apparatus.
Figure 2:
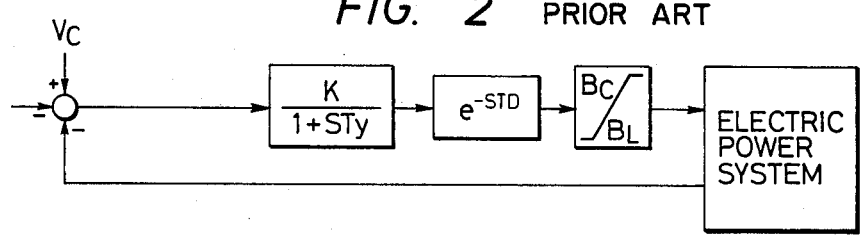
FIG. 2 is a block diagram used for illustrating the operating characteristics of the apparatus shown in FIG. 1.
Figure 3:
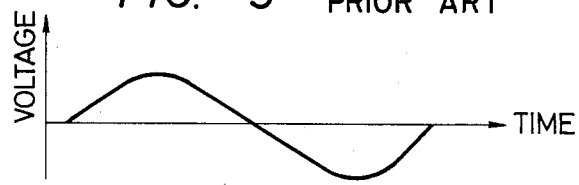
FIG. 3 is a waveform diagram showing an example of voltage changes which may be applied to the static reactive-power compensating apparatus.
Figure 4:
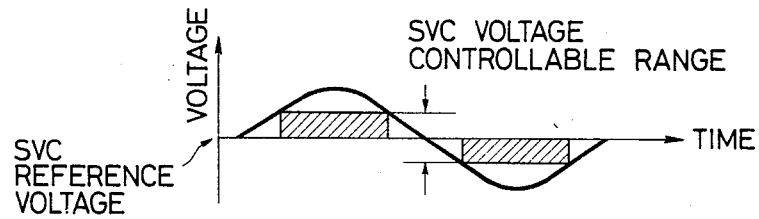
FIG. 4 is a waveform diagram showing the time in which reactive-power cannot be readily controlled in the conventional static reactive-power compensating apparatus.
Figure 7:
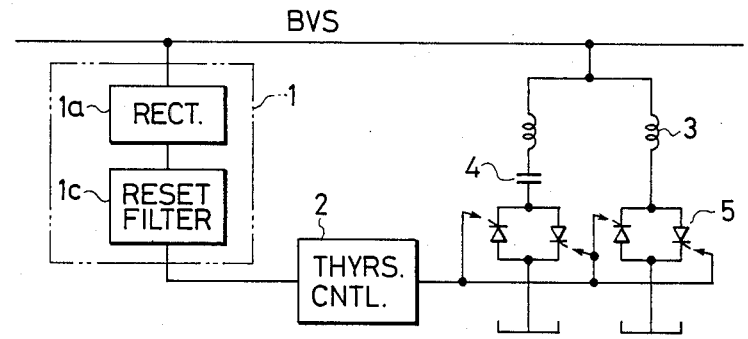
FIG. 7 is a circuit diagram of the apparatus of FIG. 5.

In FIG. 7, reference numerals used commonly in FIG. 1 denote the like elements. Further, reference numeral 1c designates a reset filter constituting a part of a control quantity detecting circuit provided in place of the reference voltage setting circuit 1b in FIG. 1. The reset filter has a transfer functions expressed as a Laplace transform, of $sT_1/(1+sT_1)$, which can readily be realized as a parallel LR filter.

In the thus-arranged SVC provided with a reset filter, it is possible to prevent actuation from occurring upon the occurrence of long-period voltage changes by suitably selecting the time constant $T_1$ of the reset filter. Hence, the apparatus responds to suppress rapid changes in the system voltage, thereby providing a high degree of system stability.

Although only thyristors are used for on/off control of the reactor 3 and the capacitor 4 in the embodiment described above, other suitable switching devices may be alternatively used for phase control. Further, in the case the total capacity of the apparatus is large, the apparatus may be divided into several separate banks.

According to the present invention, as described above, a reset filter is added to a control quantity detecting circuit to prevent actuation from occurring in response to low-frequency voltage changes so that the supply of compensating reactive power occurs only when the system voltage changes suddenly, thus providing a high degree of system stability.

We claim:

1. A static reactive-power compensating apparatus comprising: reactor energy storing means; thyristor means for selectively coupling said energy storing means to a power system to compensate for voltage variations in said power system; a thyristor control circuit for controlling said thyristors; a rectifier circuit for rectifying a line voltage of said power system; and a reset filter circuit having an input coupled to an output of said rectifier and an output applied to a controlling input of said thyristor control circuit.

2. The static reactive-power compensating apparatus of claim 1, wherein said reset filter has a transfer characteristic defined by $sT_1/(1+sT_1)$.

3. The static reactive-power compensating apparatus of claim 1, wherein a value of $T_1$ is determined in accordance with a minimum control time of said apparatus.

* * * * *